US012123666B2

(12) United States Patent
Barnes et al.

(10) Patent No.: US 12,123,666 B2
(45) Date of Patent: Oct. 22, 2024

(54) MULTIPLE FLEXIBLE LANCE DRIVE APPARATUS WITH MODULAR FOLLOWER ROLLER DECK

(71) Applicant: STONEAGE, INC., Durango, CO (US)

(72) Inventors: Jeffery R. Barnes, Ignacio, CO (US); John L. Krauser, Durango, CO (US)

(73) Assignee: STONEAGE, INC., Durango, CO (US)

( * ) Notice: Subject to any disclaimer, the term of this patent is extended or adjusted under 35 U.S.C. 154(b) by 95 days.

(21) Appl. No.: 17/689,608

(22) Filed: Mar. 8, 2022

(65) Prior Publication Data

US 2022/0290932 A1 Sep. 15, 2022

Related U.S. Application Data

(60) Provisional application No. 63/159,569, filed on Mar. 11, 2021.

(51) Int. Cl.

*F28G 1/16* (2006.01)
*B08B 9/043* (2006.01)
*F28G 15/04* (2006.01)

(52) U.S. Cl.

CPC ............ *F28G 1/163* (2013.01); *B08B 9/0433* (2013.01); *B08B 2209/04* (2013.01); *F28G 15/04* (2013.01)

(58) Field of Classification Search

CPC ....... F28G 1/163; F28G 15/04; B08B 9/0433; B08B 2209/04

See application file for complete search history.

(56) References Cited

U.S. PATENT DOCUMENTS 5,002,120 A * 3/1991 Boisture ................. F28G 15/04 165/95
5,067,558 A * 11/1991 Boisture ............ B65H 75/4402 165/95

(Continued)

FOREIGN PATENT DOCUMENTS

| | | |
|---|---|---|
| CN | 104889120 A | 9/2015 |
| CN | 207585431 U | 7/2018 |
| KR | 101195522 | 10/2012 |

OTHER PUBLICATIONS

International Search Report and Written Opinion for Application No. PCT/US2022/019307 dated Jun. 16, 2022 (12 pages).

*Primary Examiner* — Benjamin L Osterhout
(74) *Attorney, Agent, or Firm* — James H. Ortega; Stephen Y. Liu; Carstens, Allen, Gourley, LLP

(57) ABSTRACT

A multiple flexible high pressure fluid cleaning lance drive apparatus includes at least a first drive motor having a first drive shaft, a spline drive roller mounted on the first drive shaft, a plurality of cylindrical guide rollers extending parallel to the spline drive roller, an endless belt wrapped around the spline drive roller and the plurality of guide rollers, and one or more follower roller modules each supporting a plurality of follower rollers for pressing against a single flexible lance. Each follower roller module independently presses its follower rollers toward the endless belt to grip the flexible lance sandwiched therebetween. Each module has an elongated block shaped housing having a central axis, a plurality of pneumatic cylinders and a piston rod carried in each pneumatic cylinder supporting a pair of spaced follower rollers that ride on the flexible lance captured between the endless belt and the follower rollers.

20 Claims, 6 Drawing Sheets

(56) References Cited

U.S. PATENT DOCUMENTS

| | | | | |
|---|---|---|---|---|
| 5,129,455 | A * | 7/1992 | Boisture | B65H 75/4402 165/95 |
| 9,896,299 | B2 * | 2/2018 | Barnes | F28G 15/04 |
| 2011/0155174 | A1 * | 6/2011 | Moll | B08B 9/027 226/188 |
| 2014/0092234 | A1 * | 4/2014 | Thomas | B08B 1/008 348/84 |
| 2014/0261547 | A1 * | 9/2014 | Thomas | B08B 9/043 134/8 |
| 2016/0023264 | A1 * | 1/2016 | Barnes | F28G 15/04 226/152 |
| 2017/0129709 | A1 | 5/2017 | Mazur et al. | |
| 2017/0321976 | A1 * | 11/2017 | Barnes | F28G 15/02 |
| 2020/0056851 | A1 * | 2/2020 | Watkins | F28G 1/04 |
| 2020/0132402 | A1 * | 4/2020 | Schneider | F28G 15/003 |
| 2020/0391257 | A1 * | 12/2020 | Schneider | F28G 1/163 |

* cited by examiner

MULTIPLE FLEXIBLE LANCE DRIVE APPARATUS WITH MODULAR FOLLOWER ROLLER DECK

CROSS-REFERENCE TO RELATED APPLICATION

This application claims benefit of U.S. Provisional Patent Application No. 63/159,569, filed Mar. 11, 2021, entitled "Multiple Flexible Lance Drive Apparatus With Modular Follower Roller Deck", which is incorporated herein by reference in its entirety.

BACKGROUND OF THE DISCLOSURE

The present disclosure is directed to industrial high pressure water cleaning lance drive systems. Embodiments of the present disclosure are directed to an apparatus for aligning and independently driving one or more flexible tube cleaning lances in registry with tube openings through a heat exchanger tube sheet and through the tubes.

Current high pressure flexible cleaning lance drives typically drive one, two or three lances simultaneously into and through the heat exchanger tubes. In multiple lance systems, the drive mechanism drives all the lances together. The lance hoses are arranged side by side and driven together between rollers, roller/belt, or belt/belt combinations. However, each tube may present a different level of resistance to passage of the flexible lance through the tube. As a result, the gripping pressure needed to be exerted by the drive on the flexible lance is selected based on the most restrictive tube expected to be encountered. If a major obstruction is encountered in one tube all lances must be stopped, reversed and then reversed again until the obstruction is cleared before forward motion of all lances is resumed. Short of this occurrence, if gripping pressures are low, one lance will be driven less than the others which leads to lance position mismatch synchronization issues resulting in increased wear on the lance hoses and lost production. Therefore, there is a need for an apparatus to apply pressure to each lance individually so that pressure can be more accurately adjusted independently. Furthermore, it would be advantageous if a multiple lance drive apparatus could handle simultaneous driving of flexible lances of different hose diameters.

SUMMARY OF THE DISCLOSURE

The present disclosure directly addresses such needs. The embodiments described herein may be utilized with rigid (fixed) lances or flexible lances and lance hoses. One embodiment of a flexible high pressure fluid cleaning lance drive apparatus in accordance with the present disclosure includes at least a first drive motor having a first drive shaft, an elongated cylindrical spline drive roller mounted on the first drive shaft, a plurality of cylindrical guide rollers extending parallel to the spline drive roller, and an endless belt wrapped around the spline drive roller and the plurality of guide rollers. The belt has a transverse splined inner surface having splines shaped complementary to splines on the spline drive roller. A follower roller deck having a plurality of follower roller modules is carried above the belt. Each follower roller module supports a plurality of follower rollers each aligned above one of the spline driver roller and guide rollers. Each follower roller module is operable to press each follower roller carried in that particular module toward one of the spline drive rollers and guide rollers to frictionally grip a flexible lance sandwiched between the follower rollers and the endless belt.

Each follower roller module has an elongated block shaped housing having a central axis. A plurality of pneumatic cylinders is defined in the housing, each having a central axis normal to the housing central axis. Each of these cylinders is aligned along the central axis of the housing, which is parallel to the flexible lance carried beneath the module and sandwiched between the follower rollers of the module and the endless belt. A piston rod is carried in each pneumatic cylinder carrying a pair of spaced follower rollers at one end of the piston rod. Each roller is adapted to ride on an exterior surface of the flexible lance captured between the endless belt and the follower rollers.

Preferably another follower roller module, independent of the first follower roller module, is arranged side by side with an adjacent follower roller module. This another follower roller module supports another plurality of follower rollers each aligned above one of the spline driver rollers or the guide rollers to frictionally grip another flexible lance sandwiched between the another plurality of follower rollers and the endless belt. Each pneumatic cylinder preferably has a bias member disposed in the cylinder between the piston and the bottom wall of the elongated block shaped housing biasing the piston toward the top wall of the housing.

One embodiment of a follower roller deck in accordance with the present disclosure for use in a multiple flexible lance drive apparatus has a plurality of follower roller modules, for example, three modules, arranged side by side, each configured to guide one flexible lance as it is driven through the drive apparatus. Each follower roller module in the follower roller deck includes an elongated block shaped housing having a housing central axis, a top wall, a bottom wall and two outer side walls parallel to the housing central axis. A plurality of pneumatic cylinders is defined in the housing between the top wall and the bottom wall of the housing and arranged sequentially along the central axis of the housing. Each pneumatic cylinder has a central cylinder axis normal to the housing central axis and directed toward the endless belt. Each cylinder carries therein a piston connected to a piston rod having one end extending through the bottom wall. This piston rod carries one or more spaced rollers at the one end of the piston rod. Each of the one or more spaced rollers is adapted to ride on the one flexible lance.

Preferably at least one of the pneumatic cylinders has an oval cross-sectional shape. More preferably two or more of the pneumatic cylinders each have an oval cross-sectional shape such that the piston carried in the oval cylinder cannot twist or rotate within the cylinder and can only move in a direction along the cylinder axis Most preferably the follower roller deck includes at least two roller modules arranged side by side in the multiple flexible lance drive apparatus. Preferably the cross-sectional shape of each pneumatic cylinder piston in each roller module includes a major axis and a minor axis, with the major axis of the oval cross-sectional shape parallel to the housing central axis.

Preferably each module includes a bias member disposed in each cylinder between the piston and the bottom wall of the elongated block shaped housing biasing the piston toward the top wall of the housing. The follower roller deck may include an additional pneumatic cylinder within each module within and adjacent one end of the elongated block shaped housing. This additional pneumatic cylinder has a circular cross sectional shape and is configured to press a single roller against the one flexible lance.

Preferably each bias member is a coil spring around the piston rod. The follower roller deck also preferably has in each module a collar removably fixed in each pneumatic cylinder adjacent the bottom wall through which the one end of the piston rod extends, and a U shaped yoke carries the spaced rollers at the one end of each piston rod.

An embodiment in accordance with the present disclosure may be viewed as a follower roller module for use in a flexible lance drive apparatus for guiding a flexible lance as the flexible lance is driven through the flexible lance drive apparatus. The follower roller module includes an elongated block shaped housing having a housing central axis, a top wall, a bottom wall and two outer side walls parallel to the housing central axis, a plurality of pneumatic cylinders defined between the top wall and the bottom wall of the housing arranged sequentially along the central axis of the housing between the side walls. Each pneumatic cylinder has an oval cross sectional shape and a central cylinder axis normal to the housing central axis. Each pneumatic cylinder carries therein an oval shaped piston connected to a piston rod having one end extending through the bottom wall. The piston rod carries one or a pair of spaced rollers at the one end of the piston rod with each of the spaced rollers adapted to ride on the flexible lance. A bias member is disposed in each cylinder between the piston and the bottom wall of the elongated block shaped housing biasing the piston toward the top wall of the housing. The follower roller module may include an additional pneumatic cylinder within and adjacent one end of the elongated block shaped housing having a circular cross sectional shape and configured to press a single roller against the one flexible lance. Each bias member is preferably a coil spring around the piston rod. An oval collar is preferably removably fixed in the pneumatic cylinder adjacent the bottom wall through which the one end of the piston rod extends and a U shaped yoke carries the spaced rollers at the one end of the piston rod.

Further features, advantages and characteristics of the embodiments of this disclosure will be apparent from reading the following detailed description when taken in conjunction with the drawing figures.

DETAILED DESCRIPTION

Figure 1:
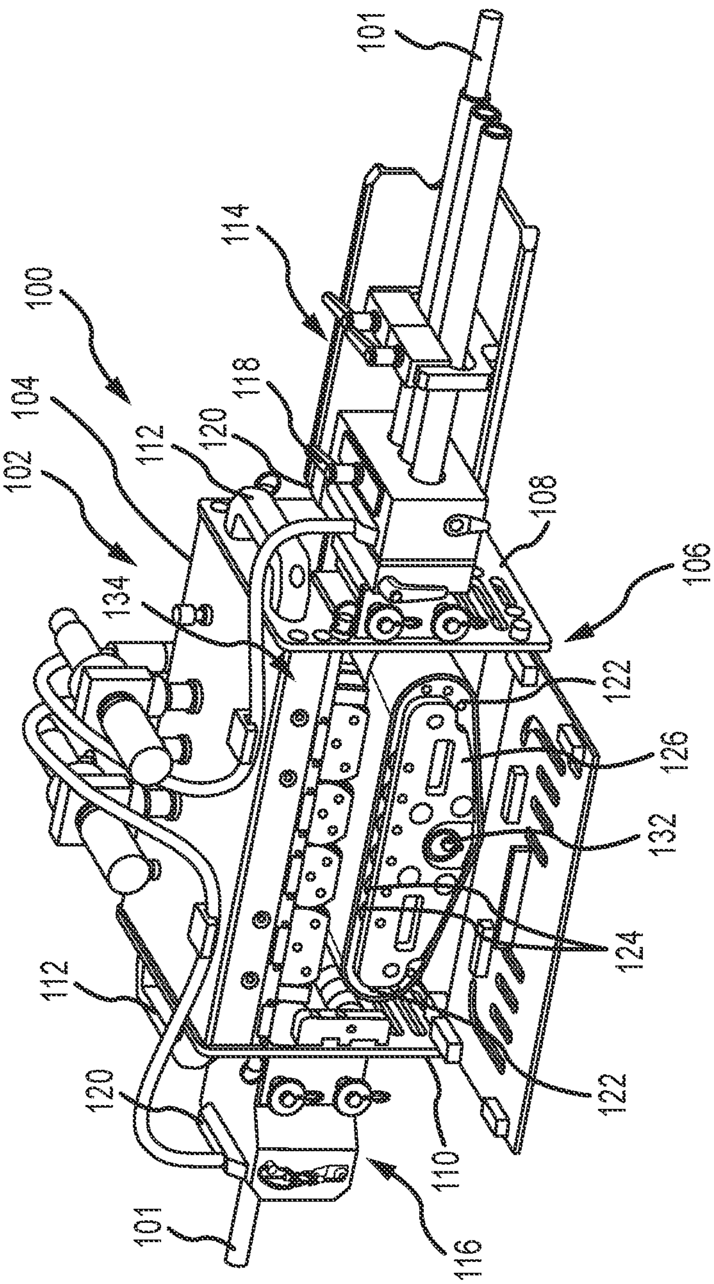
FIG. 1 is a belt side perspective view of an exemplary multiple flexible lance hose drive apparatus incorporating a follower roller deck in accordance with the present disclosure.

A belt side perspective view of a multiple lance drive apparatus 100 incorporating a follower roller deck 134 in accordance with the present disclosure is shown in FIG. 1 with its side cover open. The drive apparatus 100 has a rectangular box housing 102 that includes a flat top plate 104, a bottom plate 106, front and rear walls 108 and 110, and two C shaped carry handles 112, one on each of the front and rear walls 108 and 110.

Fastened to the front wall 108 is an exit hose guide manifold 114. Fastened to the rear wall 110 below the carry handle 112 is a hose entrance guide manifold 116. Each of these manifolds 114 and 116 includes a set of hose guide collets 118 for guiding one to three flexible lance hoses 101 into and out of the housing 102. Each guide collet set 118 is sized to accommodate a particular lance hose diameter. Hence the collet sets are changeable depending on the lance size to be driven by the apparatus 100. Each of the manifolds 114 and 116 includes a sensor module 120, typically a hall effect sensor, for detecting presence or absence of a metal hose stop element that is fastened to each flexible lance hose. These sensors are used to stop the apparatus 100 when presence of a hose stop element is sensed.

One hose stop element is preferably integrated into the threaded hose ferrule to which a nozzle is attached, at the end of each of the lance hoses. This particular hose stop element is configured to indicate, in conjunction with sensor module 120 inadvertent withdrawal of the flexible lance 101 out of a heat exchanger tube sheet (not shown) and into the drive apparatus 100. The forward manifold 114 may also include a physical collet assembly 118 to mechanically prevent flexible lance nozzle withdrawal into the drive apparatus 100.

A hose stop element called a "football" is removably fastened to each of the flexible lances 101 spaced to the rear of the rear manifold 116 to prevent over insertion of a flexible lance 101 beyond the tube being cleaned. These footballs are typically formed of pairs of C shaped metal clamps that are fastened to the lance hose at a predetermined hose length from the nozzle end to indicate full insertion of the flexible lance through a target tube sheet and tube being cleaned.

In the exemplary embodiment 100, an inner vertical support wall in the rectangular housing 102 (not visible in FIG. 1) carries a pair of pneumatic drive motors mounted such that their drive shafts protrude laterally through the support wall into the visible belt cavity and carry spline drive rollers 122. Each of the drive motors is connected to pneumatic forward feed line and reverse feed line through a feed manifold fastened to the top plate 104. Each of the drive motors is preferably a compact radial piston pneumatic motor. However, hydraulic or electric motors could alternatively be used.

Each of the motor drive shafts has an axial keyway fitted with a complementary key (not shown) that engages a corresponding keyway in a cylindrical splined drive roller 122. Each drive roller 122 is slipped onto and keyed to the drive shaft so as to rotate with the drive shaft. Spaced between the two splined drive rollers 122 is a set of six cylindrical guide rollers 124 that are supported by a vertical plate 126.

Wrapped around the spline drive rollers 122 and the guide rollers 124 is an endless belt 128. Tension on the endless belt 128 is preferably provided by a tensioner roller 130 that is supported from the inner vertical plate 126 on an eccentric shaft 132. Rotation of this eccentric shaft 132 essentially moves the tensioner roller 130 through a slight arc downward or upward to provide more or less tension on the belt 122. The guide rollers 124 and drive rollers 122 are each aligned tangent to a horizontal plane through the housing 102. The upper surface of the endless belt 128 travels along this plane and thus provides a flat surface beneath one or more flexible lance hoses 101. The endless belt 128 has a generally smooth outer surface and a transverse splined inner surface having splines shaped complementary to splines on the spline drive rollers 122.

Spaced above the belt 128 is fastened a removable follower roller deck 134 in accordance with the present disclosure. The follower roller deck 134 supports one or more follower roller modules 136 each supporting a plurality of biased follower rollers 138, each aligned above one of the spline drive roller 122 and/or guide rollers 124 and configured to press each follower roller 138 against a flexible lance 101 sandwiched between the follower rollers 138 and the endless belt 128.

This exemplary follower roller deck 134 includes a frame 140 fastened to either the top plate 104 of the housing 102 and/or both the front and rear walls 106 and 108 and supports the plurality of follower roller modules 136 arranged side by side in the deck 134.

Figure 2:
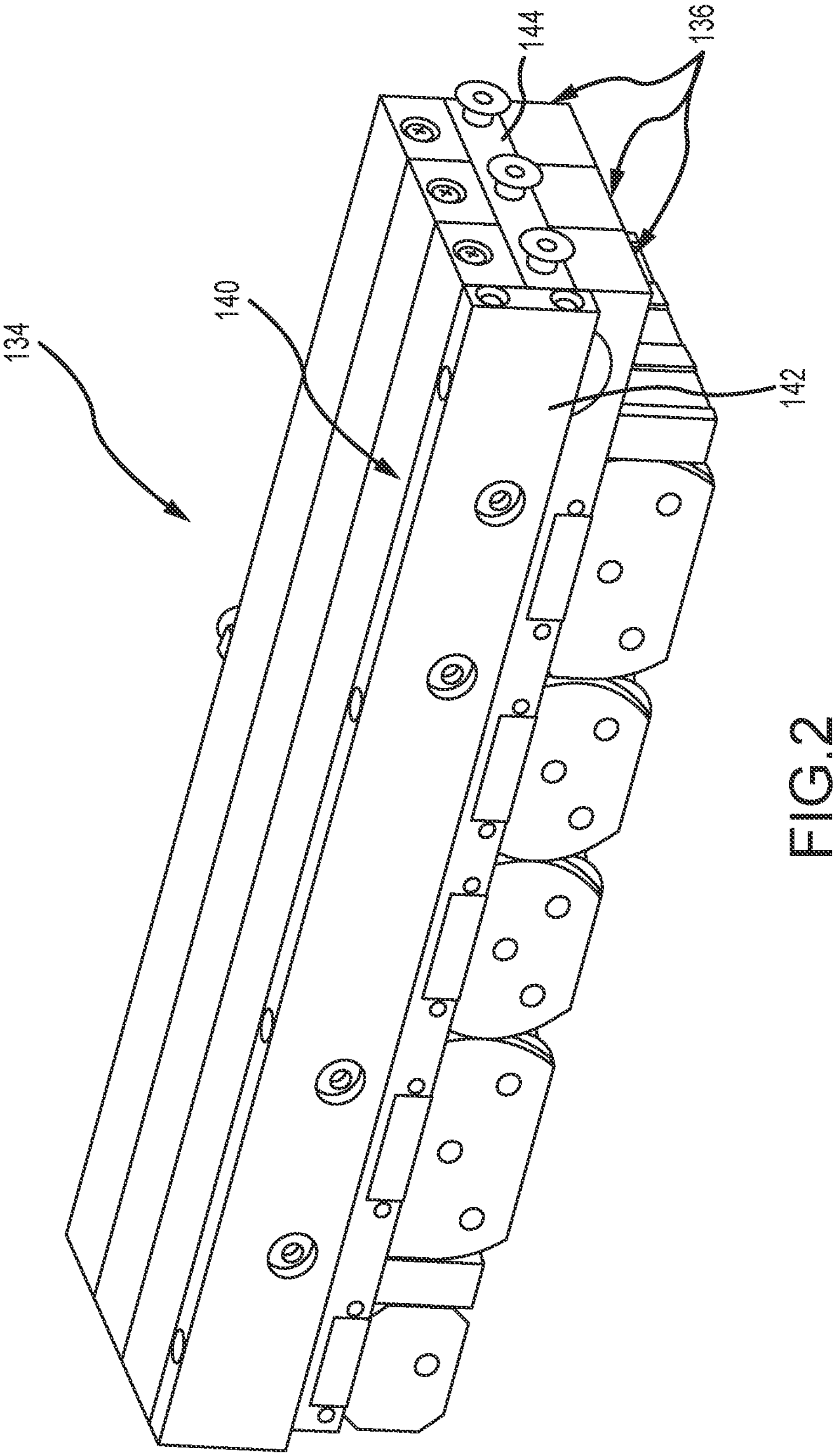
FIG. 2 is a separate perspective view of the follower roller deck removed from the multiple flexible lance hose drive apparatus shown in FIG. 1 which utilizes three follower roller modules.
Figure 3:
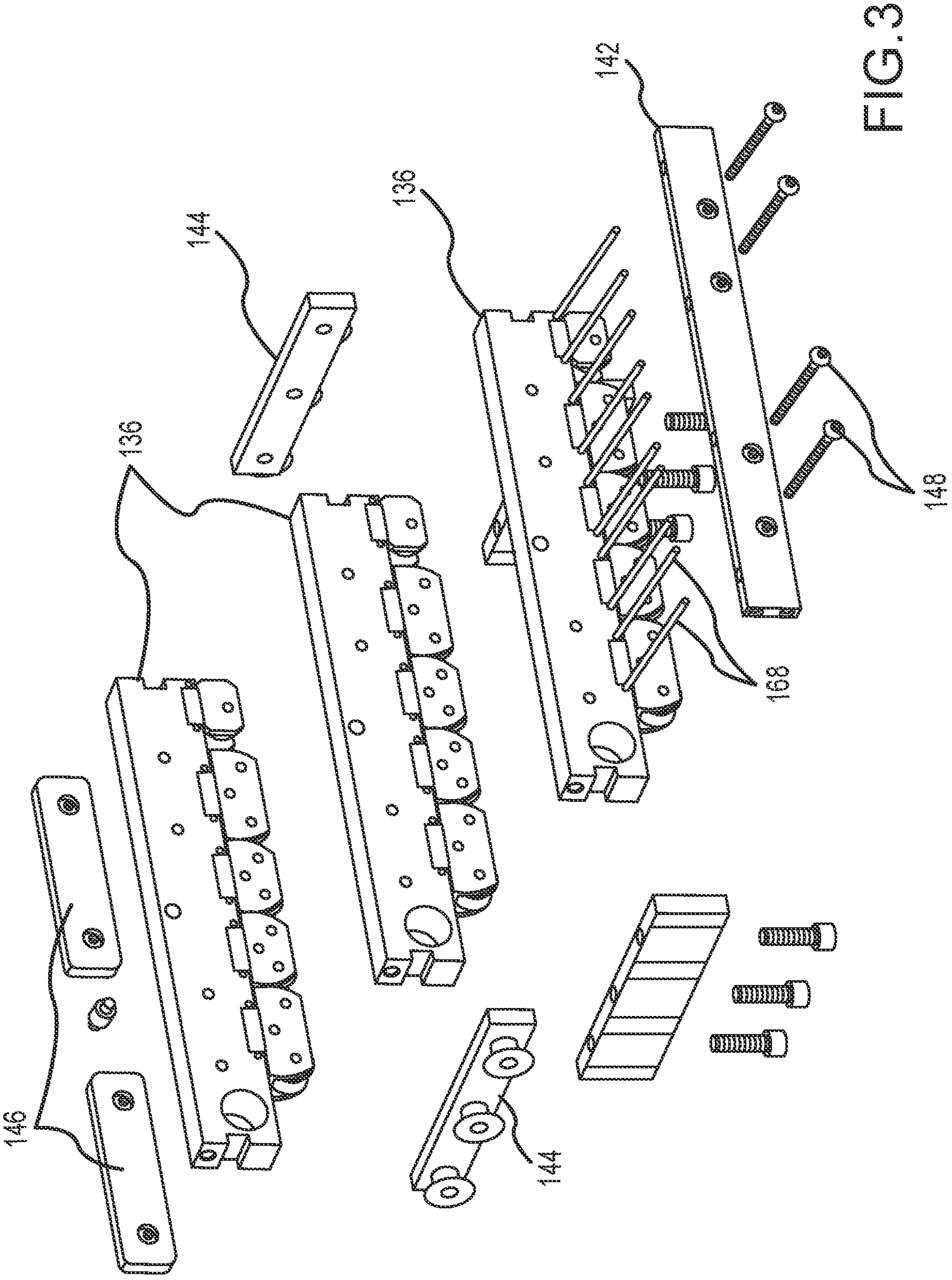
FIG. 3 is an exploded assembly view of the follower roller deck shown in FIG. 2.

A separate perspective view of an exemplary follower roller deck 134 in accordance with the present disclosure is shown in FIG. 2 and partially exploded in FIG. 3. In this exemplary embodiment the follower roller deck 134 is comprised of three follower roller modules 136 held together by a frame 140. This frame 140 is comprised of a rectangular side bar 142 and threaded bars 146 which clamp the modules 136 together via long bolts 148 through the modules 136. Four bolts 148 each pass through the side bar 142, through the modules 136 and into one of the threaded bars 146. The end bars 144 bolt to the front wall 108 and rear wall 110 and support the follower roller modules 136. The end bars 144 thus mounted provide parallel rails on the insides of walls 108 and 110 which also guide the follower roller deck 134 into the housing 102 of the multiple lance drive apparatus 100 to allow quick removal and insertion of the deck 134 for maintenance and clearing of debris.

Figure 4:
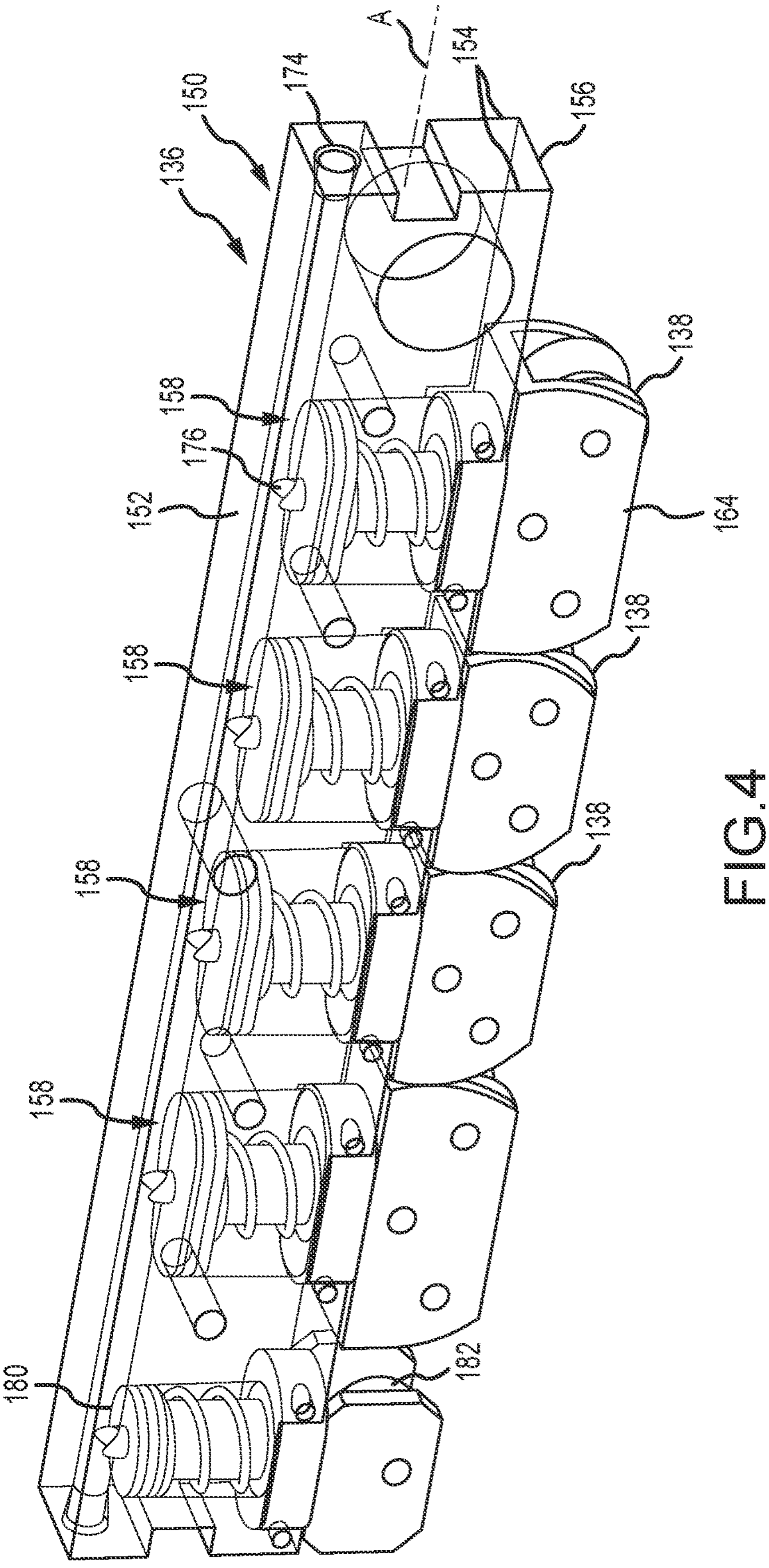
FIG. 4 is a side perspective view of one of the follower roller modules with the housing shown transparent to reveal the series of follower roller piston assemblies inside their respective cylinders.

A separate perspective view of a follower roller module 136 is shown in FIG. 4 with portions of the housing 150 shown in phantom to reveal the internal structures. Each follower roller module 136 includes an elongated block shaped housing 150 which has a central axis A and has a top wall 152, side walls 154 and a bottom wall 156 and defines a series of fluid cylinders 158, preferably pneumatic cylinders, aligned in the housing 150 along the central axis A. Each pneumatic cylinder 158 has a central axis normal to the housing central axis A and carries therein a biased piston 160 therein. Each piston 160 has a piston rod 162 that carries at one end thereof one or more of the follower rollers 138. When installed in the drive apparatus 100, each of the follower rollers 138 is vertically aligned above one of either a guide roller 124 or a drive roller 122 that press against the flexible lance hose 101 to maintain frictional contact between the lance hose 101 and the endless belt 128.

Two or more of the pneumatic cylinders 158 each has an oval cross-sectional shape with its central axis normal to the central axis A. In the embodiment 136 shown in FIGS. 1-4 there are four pneumatic cylinders 158 each having an oval cross-sectional shape. The piston 160 disposed in each cylinder 158 also has an oval cross-sectional shape. One end of the piston rod 162 is fixed to the piston 160. The other end of the piston rod 162 extends through the bottom wall 156 and pivotally fastens to a U shaped yoke 164 which in turn supports two follower rollers 138.

Each cylinder 158 also carries an oval shaped collar 166 fastened therein through which the piston rod 162 extends to pass through the bottom wall 156 of the housing 150. This oval shaped collar 166 is removably pinned to the housing 150 via pins 168 so as to close the cylinder 158 at the bottom wall 156.

Figure 5:
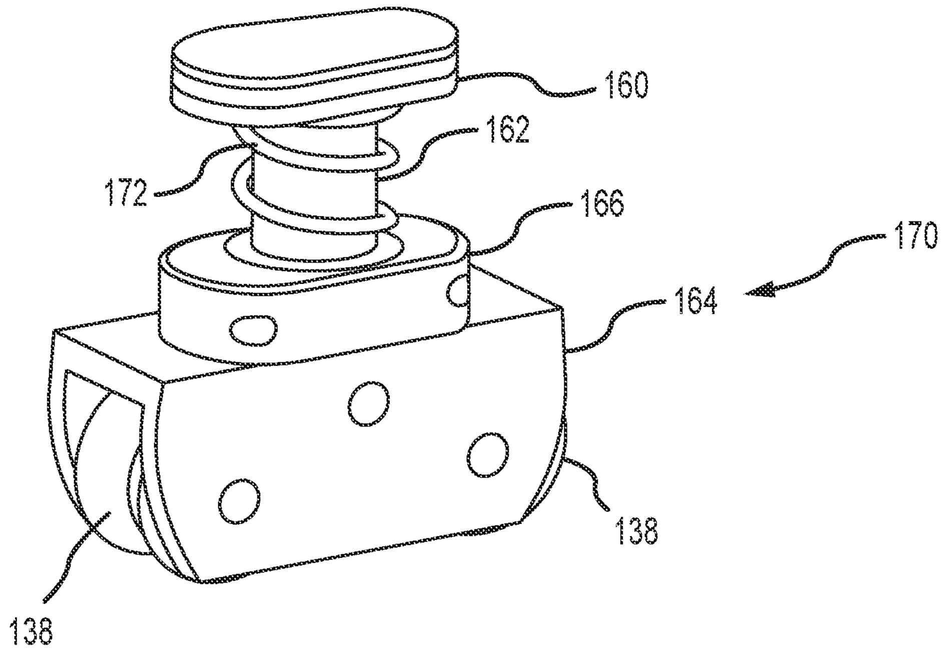
FIG. 5 is a perspective separate view of a follower roller piston assembly removed from the module housing.
Figure 6:
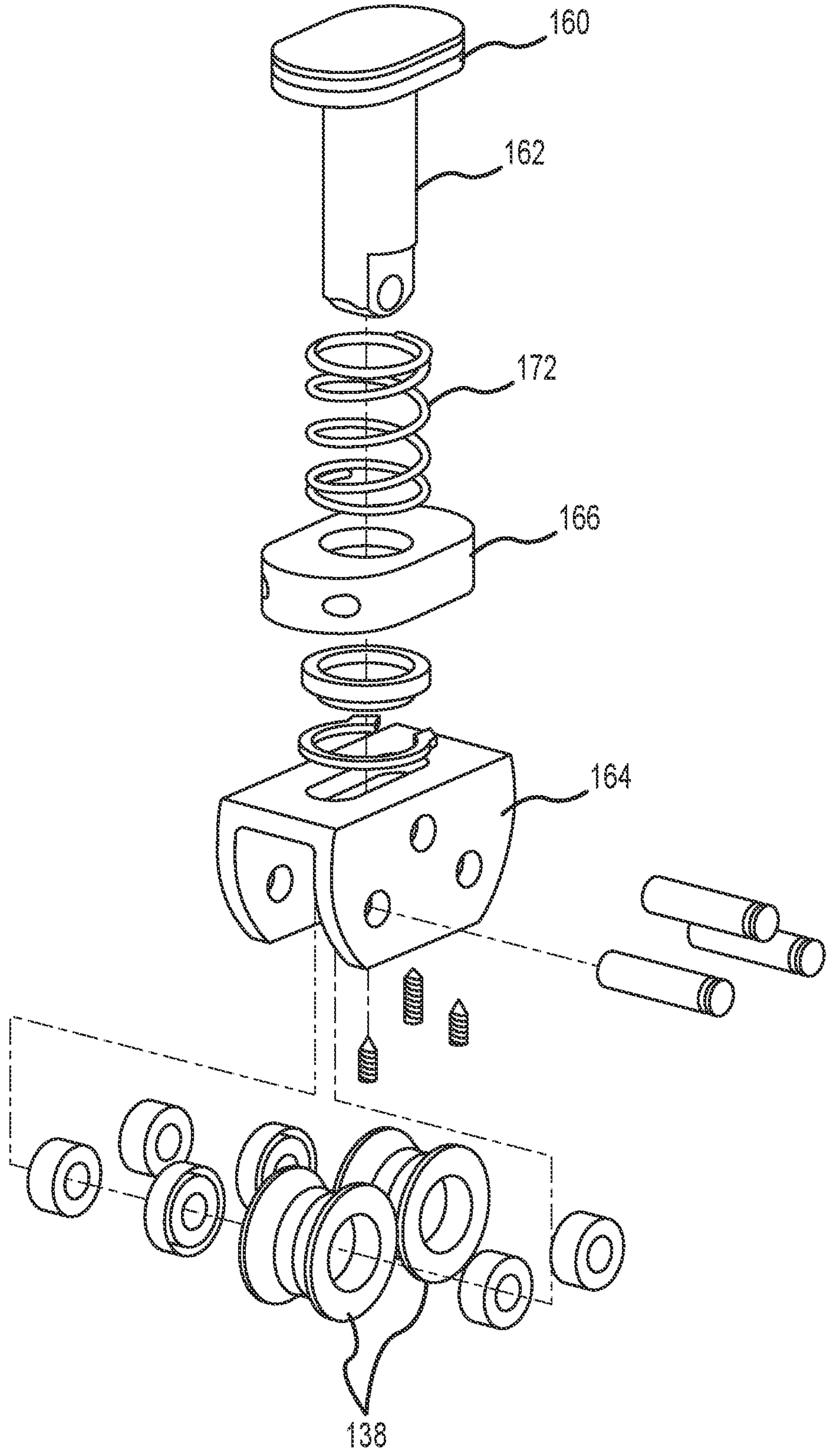
FIG. 6 is an exploded perspective view of the follower roller piston assembly shown in FIG. 5.

A separate perspective view of a piston assembly 170 removed from the module 136 is shown in FIG. 5. This piston assembly 170 includes the oval cross section piston 160, the piston rod 162 having one end fixed to the piston 160, the yoke 164 fastened to the distal end of the piston rod 162, the collar 166 that is removably installed in the cylinder 158 around the piston rod 162, and the pair of bearing supported follower rollers 138 rotatably mounted in the yoke 164. The oval collar 166 functions to close the oval bore of the cylinder 158, supports the piston rod 162 and seal the piston rod 162 within the bore as it passes through the oval collar 166. The yoke 164 is free to rotate slightly about the end of the piston rod 162 to keep the rollers 138 uniformly in contact with the outer surface of the lance hose 101. A coil spring 172 disposed around the piston rod 162 between the piston 160 and the oval collar 166 biases the piston 160 upward toward the top wall 152 of the housing 150 in the cylinder 158.

Each pneumatic cylinder 158 in each module 138 could alternatively have a circular cross section shape. However, the pneumatic cylinder 158 shown preferably has an oval cross-sectional shape so that the piston rod 162 cannot rotate about its axis during use. This arrangement precludes and/or minimizes side loading of the follower rollers 138 on the flexible lance hose 101 during operation of the apparatus 100.

The block shaped housing 150 of each module 136 has an axial bore 174 extending therethrough above the pneumatic cylinders 158. The axial bore 174 has a port 176 extending into each pneumatic cylinder 158 such that air pressure applied to the bore 174 equally and simultaneously presses on each of the pistons 160 to in turn move each of the pistons 160 downward so as to drive the follower rollers 138 into firm engagement with the flexible lance hose 101 gripped between the follower rollers 138 and the flexible belt 122.

In the exemplary drive apparatus 100, air pressure can be separately applied to each module 136 in the deck 134. This arrangement permits an operator to optimally adjust pressure to each lance 101 driven by the apparatus 100. This is particularly advantageous in order to consistently drive multiple lances simultaneously and to control gripping pressure if an individual lance 101 will be driven. Furthermore, having the applied pressure individually adjustable for each lance in the multiple lance drive apparatus 100 permits simultaneous use of flexible lance hoses having different diameters at the same time, and permits consistent travel times for sets of lances where internal tube conditions may differ, which can minimize lance hose wear.

The follower roller module 136 shown may also be configured with one or more pneumatic cylinders 180 having a circular cross section, for example carrying a single follower roller 138. The embodiment shown in FIG. 1-4 incorporates one such pneumatic cylinder 180 for pressing a single follower roller 182 against a lance 101 captured between the roller 182 and a position sensor roller (not shown).

On important advantage of utilizing a follower roller deck 134 in accordance with this disclosure is the independent clamp control associated with each lance 101. The operator has the ability to effectively turn lances "off" with independent pressure control of each lance follower module 136. This is particularly useful with tube sheet mapping and a high number of driven lances 101 via one drive apparatus 100. For example, one instance in which this capability would be effective is skipping tubes with mechanical plugs or edge conditions without affecting operation across the map.

Another advantage is the ability to feed different OD hoses. This may be especially useful for feeding tube inspection equipment as opposed to a cleaning lance. Also, this may be a useful feature for a customer who currently runs 20 kpsi to unplug the bundle of tubes and then polishes at 40 kpsi. One could even feed one 40 kpsi lance and one 20 kpsi lance and one inspection cable/camera at the same time in a triple lance drive apparatus 100.

Another advantage of a multiple lance drive apparatus 100 in accordance with the present disclosure is the ability to compensate individually each lance being driven for belt/roller wear or damage to the lance hose cover and maintain peak throughput performance of the drive 100. Current tractor drives cannot function normally if excessive wear occurs for only one lance. In other words, drive performance is dictated by the weakest gripped lance hose 101 in the set of lances being driven.

Many changes may be made to any one of the components of apparatus 100 described above which will become apparent to one reading the above disclosure. For example, any number of modules 136 may be ganged together in a deck 134 such that the apparatus may be configured to drive 3, 4, 5, or even 6 lances simultaneously. Alternatively the module 136 may be configured with multiple pneumatic cylinders each having a circular cross sectional shape rather than oval. Each cylinder could carry a piston for biasing only a single follower roller or more than two follower rollers in that instance. All such changes, alternatives and equivalents in accordance with the features and benefits described herein, are within the scope of the present disclosure. Such changes and alternatives may be introduced without departing from the spirit and broad scope of our disclosure as defined by the claims below and their equivalents.

What is claimed is:

1. A flexible high pressure fluid cleaning lance drive apparatus comprising:

at least a first drive motor having a first drive shaft;

an elongated cylindrical spline drive roller mounted on the first drive shaft;

a plurality of cylindrical guide rollers extending parallel to the spline drive roller;

an endless belt wrapped around the spline drive roller and the plurality of guide rollers, the belt having a transverse splined inner surface having splines shaped complementary to splines on the spline drive roller; and a follower roller module supporting a plurality of in-line follower rollers each aligned above one of the spline driver roller and guide rollers, wherein the follower roller module is operable to press each follower roller toward one of the spline drive roller and guide rollers to frictionally grip a flexible lance sandwiched between the plurality of in-line follower rollers and the endless belt, wherein the follower roller module comprises an elongated block shaped housing having a central axis;

a plurality of oval pneumatic cylinders defined in the housing each having a central axis normal to the housing central axis; and a piston rod carried in each pneumatic cylinder, each piston rod carrying a pair of spaced follower rollers of the plurality of in-line follower rollers at one end of the piston rod, each piston rod and pair of follower rollers configured to move along a corresponding cylinder central axis independently of other piston rods and pairs of follower rollers, and each pair of follower rollers adapted to ride on an exterior surface of the flexible lance captured between the endless belt and the plurality of in-line follower rollers.

2. The apparatus according to claim 1 further comprising another follower roller module independent of the first follower roller module supporting another plurality of follower rollers each aligned above one of the one spline driver roller or the guide rollers to frictionally grip another flexible lance sandwiched between the another plurality of follower rollers and the endless belt.

3. The apparatus according to claim 1 further comprising a bias member disposed in each cylinder between the piston and a bottom wall of the elongated block shaped housing biasing a top wall of the housing.

4. A follower roller deck for use in a multiple flexible lance drive apparatus having a plurality of follower roller modules each having a plurality of in-line follower rollers configured to guide one flexible lance as it is driven through the drive apparatus, each follower roller module in the follower roller deck comprising:

an elongated block shaped housing having a housing central axis, a top wall, a bottom wall and two outer side walls parallel to the housing central axis;

a plurality of pneumatic cylinders defined between the top wall and the bottom wall of the housing arranged sequentially along the central axis of the housing, each pneumatic cylinder having a central cylinder axis normal to the housing central axis, each carrying therein a piston connected to a piston rod having one end extending through the bottom wall, each piston rod carrying one or more spaced rollers at the one end of the piston rod, each of the piston rods and carried spaced rollers configured to move along a corresponding central cylinder axis independently of other piston rods and carried spaced rollers, each of the one or more carried spaced rollers adapted to ride on the one flexible lance.

5. The follower roller deck according to claim 4 wherein at least one of the pneumatic cylinders has an oval cross-sectional shape.

6. The follower roller deck according to claim 5 wherein the cross-sectional shape of each pneumatic cylinder piston in each roller module includes a major axis and a minor axis, with the major axis of the oval cross-sectional shape parallel to the housing central axis.

7. The follower roller module deck according to claim 6 further comprising a U shaped yoke connected to each piston rod and carrying the spaced rollers at the one end of each piston rod.

8. The follower roller deck according to claim 5 further comprising an additional pneumatic cylinder within each module within and adjacent one end of the elongated block shaped housing, the additional pneumatic cylinder having a circular cross sectional shape and configured to press a single roller against the one flexible lance.

9. The follower roller deck according to claim 4 further comprising each module including a bias member disposed in each cylinder between the piston and the bottom wall of the elongated block shaped housing biasing the piston toward the top wall of the housing.

10. The follower roller deck according to claim 9 wherein each bias member is a coil spring around the piston rod.

11. The follower roller deck according to claim 4 further comprising a collar removably fixed in each pneumatic cylinder adjacent the bottom wall through which the one end of the piston rod extends.

12. The follower roller deck according to claim 4 further comprising a U shaped yoke carrying the spaced rollers at the one end of each piston rod.

13. The follower roller deck according to claim 4 further comprising at least two roller modules arranged side by side in the multiple flexible lance drive apparatus.

14. A follower roller module for use in a flexible lance drive apparatus for guiding a flexible lance as the flexible lance is driven through the flexible lance drive apparatus, the follower roller module comprising:

an elongated block shaped housing having a housing central axis, a top wall, a bottom wall and two outer side walls parallel to the housing central axis;

a plurality of pneumatic cylinders defined between the top wall and the bottom wall of the housing arranged sequentially along the central axis of the housing, each pneumatic cylinder having an oval cross sectional shape and a central cylinder axis normal to the housing central axis, each pneumatic cylinder carrying therein an oval shaped piston connected to a piston rod having one end extending through the bottom wall, each piston rod carrying a pair of spaced in-line rollers at the one end of each piston rod, each piston rod and pair of in-line rollers configured to move along a corresponding central axis independently of other piston rods and pairs of in-line rollers, each of the pairs of spaced in-line rollers adapted to ride on the flexible lance.

15. The follower roller module according to claim 14 further comprising a bias member disposed in each cylinder between the piston and the bottom wall of the elongated block shaped housing biasing the piston toward the top wall of the housing.

16. The follower roller module according to claim 15 wherein each bias member is a coil spring around the piston rod.

17. The follower roller module according to claim 14 further comprising an additional pneumatic cylinder within and adjacent one end of the elongated block shaped housing having a circular cross sectional shape and configured to press a single roller against the one flexible lance.

18. The follower roller module according to claim 14 further comprising an oval collar removably fixed in each pneumatic cylinder adjacent the bottom wall through which the one end of the piston rod extends.

19. The follower roller module according to claim 18 further comprising a U shaped yoke carrying the spaced rollers at the one end of the piston rod.

20. The follower roller module according to claim 14 further comprising a U shaped yoke carrying the spaced rollers at the one end of the piston rod.

* * * * *